No. 794,185. PATENTED JULY 11, 1905.
E. MEDEN.
WEARING RING FOR CENTRIFUGAL PUMPS.
APPLICATION FILED JULY 21, 1904.

WITNESSES:
J. A. Van Wart
C. D. Morgan.

INVENTOR
Elof Meden
BY Park Benjamin
his ATTORNEY

No. 794,185.

Patented July 11, 1905.

UNITED STATES PATENT OFFICE.

ELOF MEDEN, OF NEW YORK, N. Y., ASSIGNOR TO DE LAVAL STEAM TURBINE COMPANY, A CORPORATION OF NEW JERSEY.

WEARING-RING FOR CENTRIFUGAL PUMPS.

SPECIFICATION forming part of Letters Patent No. 794,185, dated July 11, 1905.

Application filed July 21, 1904. Serial No. 217,584.

*To all whom it may concern:*

Be it known that I, ELOF MEDEN, of the city, county, and State of New York, have invented a new and useful Improvement in Wearing-Rings for Centrifugal Pumps, of which the following is a specification.

The invention relates to centrifugal pumps; and it consists in the combination, with a rotary pump-wheel and a casing therefor having an internal flange constructed to inclose the circumferential periphery of said wheel, and a wearing-ring having an external circumferential groove receiving said flange and interposed between said flange and said wheel.

Figure 1:
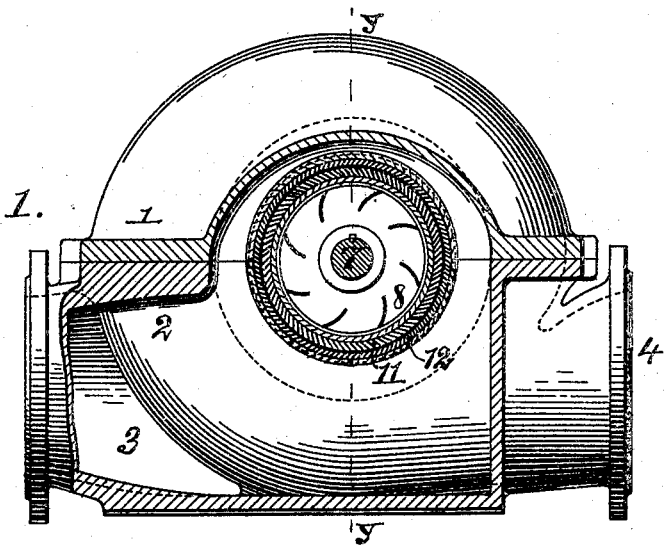
Figure 2:
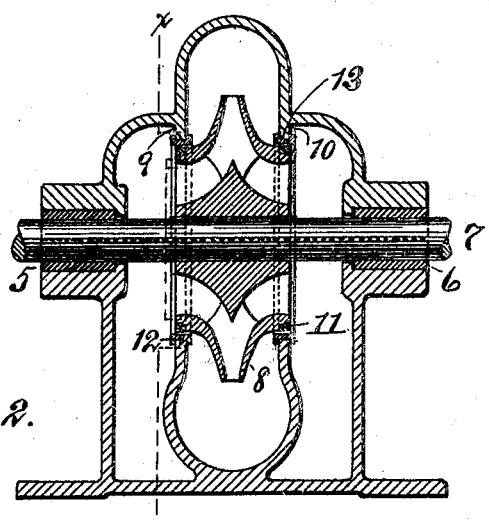
Figure 3:
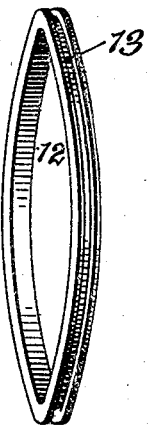

In the accompanying drawings, Figure 1 is a section of a centrifugal pump, showing wearing-rings applied to both pump-wheel and casing on the line $x$ $x$ of Fig. 2. Fig. 2 is a section on the line $y$ $y$ of Fig. 1. Fig. 3 shows separately the wearing-ring which is applied to the casing.

Similar numbers of reference indicate like parts.

The pump-casing is divided horizontally into two sections 1 and 2, which are detachably secured by any suitable means. The inlet 3 and the outlet 4 are formed in the lower section 2. The bearings 5 and 6 for the wheel-shaft 7 are in both sections. The pump-wheel 8 of usual construction is keyed on the shaft 7. Ordinarily within the casing-sections there are formed semicircular flanges 9 and 10, which inclose the pump-wheel and make a joint with the periphery thereof. Between the meeting faces of said flanges and of the wheel-periphery there is apt to be much wear, especially if the liquid pumped contains grit or dirt. This soon results in undesirable leakage and frequently renders renewal of the casing necessary. To obviate this difficulty, I form on the periphery of the pump-wheel 8, at the ends thereof, inclined or outwardly-tapering shoulders, upon which I place wearing-rings 11, of any suitable metal, such as bronze. The rings 11 may be driven tightly upon the tapering shoulders, and so secured in place. Surrounding the rings 11 are rings 12, having an external groove formed around their circumferences, which groove receives the flanges 9 and 10. The inner circumferential faces of the rings 12 bear upon the outer circumferential faces of the rings 11, and hence the frictional wear due to the rotation of the pump-wheel 8 comes on said rings.

In assembling the parts the rings 12 are placed upon the rings 11, and the upper casing-section 1 being removed the flanges 9 and 10 are seated in the groove 13 of the rings 12. The upper section 1 is then placed in position. It will be obvious that the wearing-rings are easily removable whenever worn, so that new ones can be substituted. In this way the effective lifetime of the pump is greatly increased. The object of seating the flanges 9 and 10 in the groove of rings 12 is to prevent lateral displacement of said rings.

I do not claim herein in combination with a single rotary pump-wheel a casing therefor having openings in its opposite sides, wearing-rings secured in said openings, and wearing-rings secured on said wheel-periphery and received in said first-named wearing-rings, the bearing-surfaces being parallel to the axis of said wheel, inasmuch as the same is claimed by me in another pending application, Serial No. 217,583, filed July 21, 1904.

I claim—

1. In combination with a rotary pump-wheel and a casing therefor having an internal flange constructed to inclose the circumferential periphery of said wheel, a wearing-ring having an external circumferential groove receiving said flange and interposed between said flange and said wheel.

2. In combination with a rotary pump-wheel, a casing therefor horizontally divided into an upper and lower section and provided internally with a flange constructed to inclose the circumferential periphery of said wheel, a wearing-ring having an external circumferential groove receiving said flange and interposed between said flange and said wheel.

3. In combination with a rotary pump-wheel and a casing therefor having an internal flange constructed to inclose the circumferential periphery of said wheel, a wearing-ring having an external circumferential groove receiving said flange and a second wearing-ring secured upon said wheel and disposed within said first-named ring.

In testimony whereof I have signed my name to this specification in the presence of two subscribing witnesses.

ELOF MEDEN.

Witnesses:
GEO. R. REMINGTON,
GEO. D. TALLMAN.